United States Patent
Odell et al.

(10) Patent No.: US 9,112,766 B2
(45) Date of Patent: Aug. 18, 2015

(54) METHOD AND APPARATUS HAVING IMPROVED LINE RATE IP PACKET COMMUNICATION

(71) Applicant: Fluke Corporation, Everett, WA (US)

(72) Inventors: Craig Odell, Colorado Springs, CO (US); Nathan Archer, Everett, WA (US)

(73) Assignee: Fluke Corporation, Everett, WA (US)

( * ) Notice: Subject to any disclaimer, the term of this patent is extended or adjusted under 35 U.S.C. 154(b) by 232 days.

(21) Appl. No.: 13/829,863

(22) Filed: Mar. 14, 2013

(65) Prior Publication Data

US 2014/0269748 A1 Sep. 18, 2014

(51) Int. Cl.
*H04L 12/863* (2013.01)
*H04L 12/26* (2006.01)

(52) U.S. Cl.
CPC .............. *H04L 43/00* (2013.01); *H04L 47/50* (2013.01)

(58) Field of Classification Search
None
See application file for complete search history.

(56) References Cited

U.S. PATENT DOCUMENTS

| | | | | |
|---|---|---|---|---|
| 5,586,030 A * | 12/1996 | Kemner et al. | | 701/23 |
| 5,867,734 A * | 2/1999 | Drews | | 710/52 |
| 5,959,994 A * | 9/1999 | Boggs et al. | | 370/399 |
| 6,128,674 A * | 10/2000 | Beukema et al. | | 710/23 |
| 6,529,519 B1 * | 3/2003 | Steiner et al. | | 370/412 |
| 6,742,017 B1 * | 5/2004 | Black et al. | | 709/211 |
| 7,127,524 B1 * | 10/2006 | Renda et al. | | 709/245 |
| 8,161,205 B1 * | 4/2012 | Venkatesh et al. | | 710/33 |
| 8,811,407 B1 * | 8/2014 | Carothers et al. | | 370/395.41 |
| 2005/0102531 A1 * | 5/2005 | Yang | | 713/200 |
| 2008/0229075 A1 * | 9/2008 | Froemming et al. | | 712/210 |
| 2009/0307557 A1 * | 12/2009 | Rao et al. | | 714/749 |

* cited by examiner

*Primary Examiner* — Bunjob Jaroenchonwanit
(74) *Attorney, Agent, or Firm* — Locke Lord LLP; Scott D. Wofsy; Christopher J. Capelli

(57) ABSTRACT

An apparatus having improved line rate communication. A Media Access Controller (MAC) accesses each reference pointer stored in transmission slots of a first sub-queue of a transmission queue. Notably, each reference pointer is indexed to a shared memory frame. The MAC transmits data from the shared memory frame in response to accessing the reference pointer, and triggers at least one interrupt when each reference pointer of the first sub-queue is accessed at least once. A processor and/or the MAC can mark in response to the at least one interrupt, each transmission slot of the first sub-queue as ready for transmission.

20 Claims, 6 Drawing Sheets

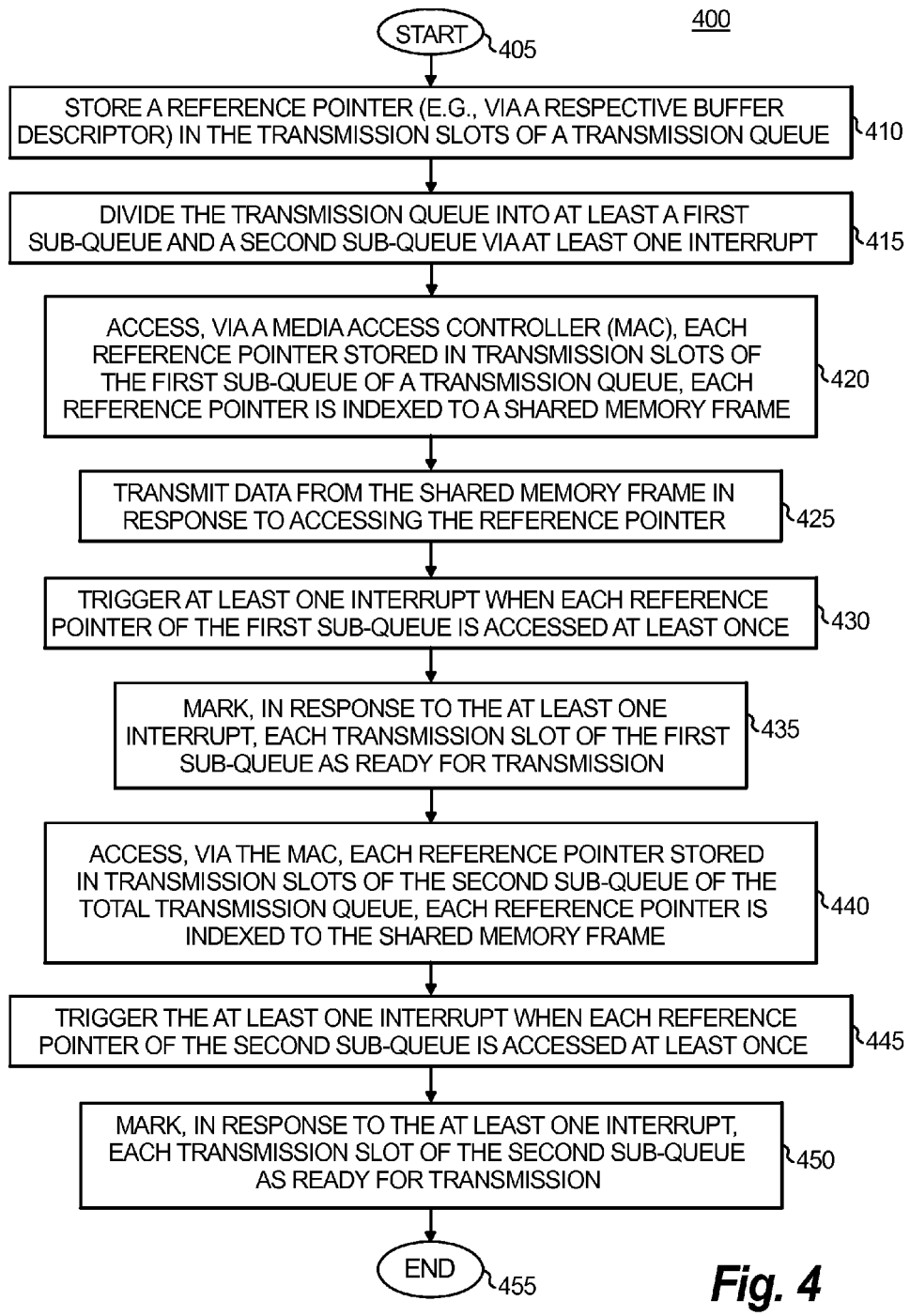

… … …

METHOD AND APPARATUS HAVING IMPROVED LINE RATE IP PACKET COMMUNICATION

BACKGROUND

1. Field of the Invention

The present disclosure relates to Internet Protocol (IP) communication, and more particularly, to improved line rate IP packet communication.

2. Description of the Related Art

Currently, various methods for testing throughput performance include transmission of data packets across one or more network devices. For example, a Request For Comment (RFC) 2544 standard, established by the Internet Engineering Task Force (IETF) standards body, outlines communication tests required to measure and prove performance criteria for carrier Ethernet networks. The RFC 2544 standard provides a benchmarking methodology to evaluate the performance of network devices using throughput, back-to-back, frame loss and latency tests, with each test validating a specific part of an service-level agreement (SLA). In particular, the methodology defines the frame size, test duration, number of test iterations, etc.

With respect to throughput, RFC 2544 tests communication (i.e., transmitting and receiving) IP packets at full line rate (i.e., 1 Gbps). Traditionally, conventional devices use specialized hardware such as field-programmable gate arrays (FPGAs) to achieve such full line rates. However, such specialized hardware includes complex circuitry, which in turn, raises an overall cost for a device. Although such conventional specialized hardware has generally been considered satisfactory for their intended purpose, there is still a need in the art for a simplified method and apparatus that allows for improved line rate IP packet communication. The present invention provides a solution for these problems.

SUMMARY

The subject invention is directed to improved line rate communication. In one exemplary embodiment, a media access controller (MAC) accesses each reference pointer stored in transmission slots of a first sub-queue of a transmission queue. Each reference pointer is indexed to a shared memory frame. The MAC can further transmit data from the shared memory frame in response to accessing the reference pointer, trigger at least one interrupt when each reference pointer of the first sub-queue is accessed at least once, and mark, in response to the at least one interrupt, each transmission slot of the first sub-queue as ready for transmission. Notably, in some embodiments, the processor can mark each transmission slot of the first sub-queue as ready for transmission.

Once the MAC accesses each transmission slot of the first sub-queue, the MAC can further access each reference pointer stored in transmission slots of a second sub-queue of the transmission queue. Each reference pointer of the second sub-queue, like the first sub-queue, can index to the shared memory frame. The MAC also triggers the at least one interrupt when each reference pointer of the second sub-queue is accessed at least once. The MAC and/or the processor can mark, in response to the at least one interrupt, each transmission slot of the second sub-queue as ready for transmission. In some embodiments, a processor further divides, via at least one interrupt, the transmission queue into the first and second sub-queues (e.g., which can be the same size) and also stores each reference pointer in the transmission slots of the transmission queue.

In certain other embodiments, the MAC can receive a data packet associated with an Internet Protocol (IP) address and determine if the data packet is a throughput test packet based on the IP address, a particular field or set of fields in a header or a payload of the data packet, a transmission control protocol (TCP), a UDP port number, an 802.3 EtherType field, a class-of-service or quality of service tag, etc. The MAC rejects the data packet when it is a throughput test packet (e.g., before any additional processing can occur) and increments a counter when the data packet is rejected. Further, in some embodiments, if data packet is further associated with a User Datagram Protocol (UDP) Port the MAC determines if the data packet is a throughput packet based on the IP address and the UDP port. In some embodiments the MAC and/or processor can instantiate the counter at zero before receiving any data packets.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 4 illustrates an example simplified test procedure for transmitting data packets at full line rate in accordance with one or more embodiments described herein;

A component or a feature that is common to more than one drawing is indicated with the same reference number in each of the drawings.

DESCRIPTION OF THE INVENTION

Figure 1:
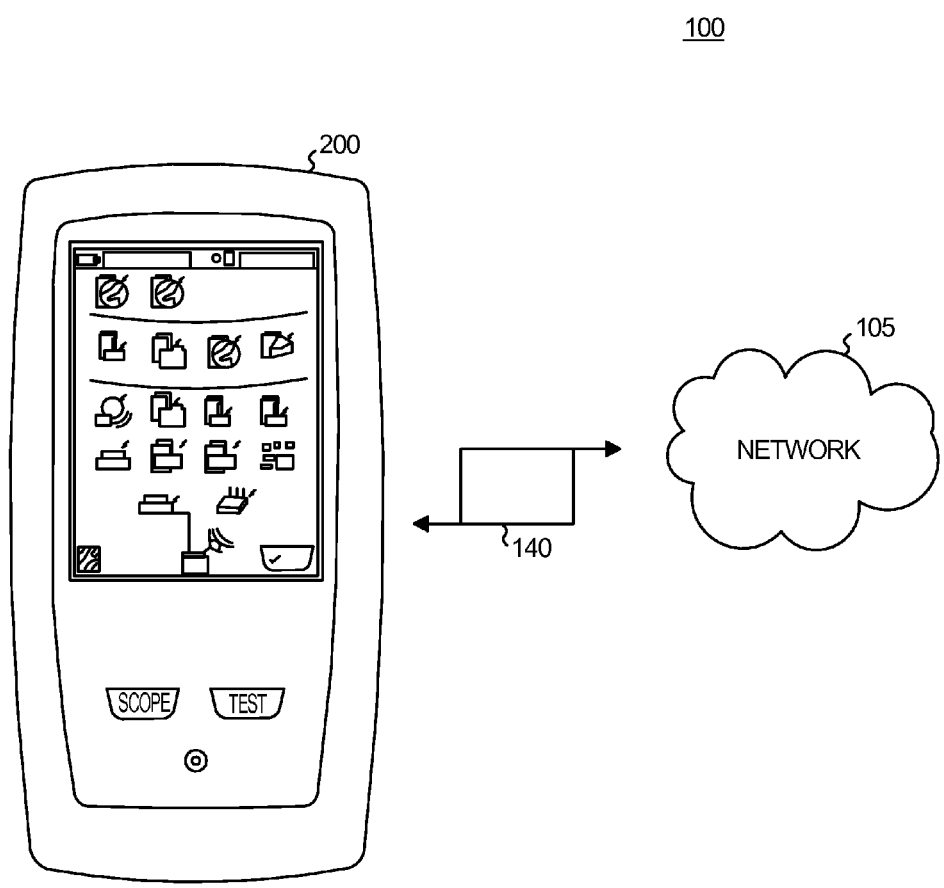
FIG. 1 is a schematic block diagram of an exemplary embodiment of a device having improved line rate communication constructed in accordance with the present invention, showing the device communicating data packets with a communication network.

Reference will now be made to the drawings wherein like reference numerals identify similar structural features or aspects of the subject invention. For purposes of explanation and illustration, and not limitation, a partial view of an exemplary embodiment of the apparatus having improved line rate Internet Protocol (IP) packet communication in accordance with the invention is shown in FIG. 1 and is designated generally by reference character 200. Other embodiments of devices having improved line rate IP packet communication in accordance with the invention, or aspects thereof, are provided in FIGS. 2-6, as will be described herein.

FIG. 1 is a schematic block diagram 100 an exemplary embodiment of a device 200 having improved line rate communication constructed in accordance with the present invention, showing the device 200 communicating data packets 140 with a communication network 105. Device 200 can communicate with other devices, apparatuses, etc. of network 105 via, for example predefined network communication protocols as will be appreciated by those skilled in the art, such as various wired protocols, wireless protocols etc., where appropriate. In this context, a protocol consists of a set of rules defining how the devices interact with each other. Those skilled in the art will understand that any number of devices, nodes, links, etc. may be used in the communication network 105, and that the view shown herein is for simplicity.

Figure 2:
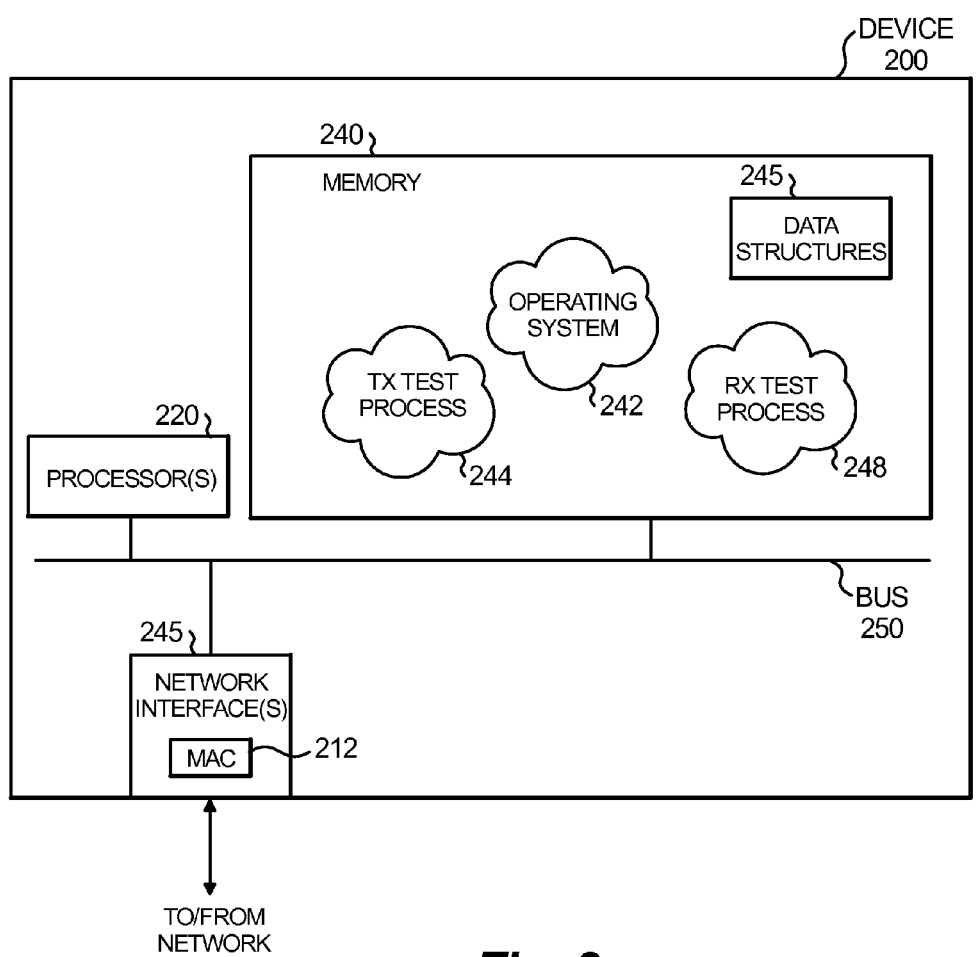
FIG. 2 is an internal schematic block diagram of the device shown in FIG. 1, showing various hardware and software components.

FIG. 2 is an internal schematic block diagram of the device shown in FIG. 1, showing various hardware components. Device 200 may comprise one or more network interfaces 210 (e.g., wired, optical, wireless, etc.), a processor(s) 220, and a memory 240 interconnected by a system bus 250.

The network interface(s) 210 contain the mechanical, electrical, and signaling circuitry for controlling operation of device 200 and can include a media access controller (MAC) 212, which can communicate data to/from network 105 using a variety of different communication protocols.

Memory 240 comprises a plurality of storage locations that are addressable by the processor 220, MAC 212 and the network interfaces 210 for storing software programs and data structures associated with the embodiments described herein. Note that certain embodiments of device 200 may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor and/or network interfaces 210 (i.e., via MAC 212), functionally organizes the device by, inter alia, invoking operations in support of software processes and/or services executing on the device. These software processes and/or services may comprise an illustrative transmit test process/services 244 and a receive test process/services 248, as described herein. Note that while these processes/services are shown in centralized memory 240, alternative embodiments provide for specific operation within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Each of the services/processes described above contains computer executable instructions executed by the processor 220 to perform throughput test functions provided by one or more communication protocols, as will be understood by those skilled in the art, and as modified according to the techniques described herein. These functions may, for example, be capable of general packet detection/transmission, etc., according to the associated protocols and the techniques described herein, and according to the various tables, lists, mappings, etc. (e.g., data structures 245).

Figure 3A:
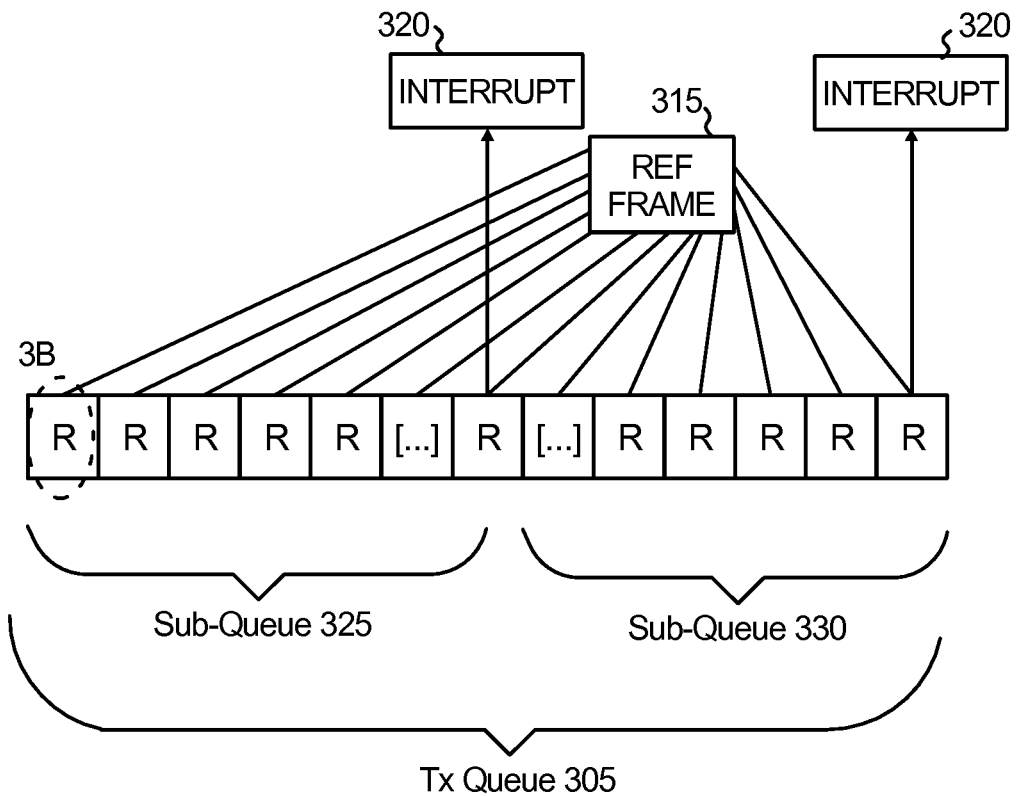
FIG. 3A illustrates an example transmission queue for a transmit test process, showing buffer descriptors stored in respective transmission slots.

FIG. 3A illustrates an example transmission queue 305 for transmit test process 244. As shown, buffer descriptors 310 can be stored in respective slots of a transmission queue 305, which can reside in data structures 245. Buffer descriptors are data structures that reside in memory (i.e., memory 240), and can include a reference pointer and meta-data that may include both status and/or control information. Each reference pointer indexes to (e.g., references) a respective reference frame or memory frame and as shown, each reference pointer shares a same reference frame 315.

Figure 3B:
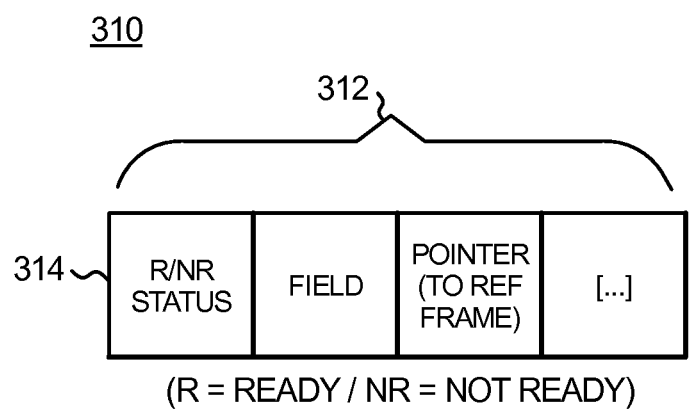
FIG. 3B illustrates an enhanced view of buffer descriptors, shown in FIG. 3A.

Referring to an enhanced view of the buffer descriptors 310 shown in FIG. 3B, each buffered descriptor 310 can include various data fields 312 such as a ready-to-transmit flag, generate-interrupt-on-completion flag, a reference or index pointer, etc. Ready-to-transmit flag 313 can include a transmission status such as ready ("R") or not ready ("NR"). Reference or index pointer causes MAC 212 to locate and transmit a data packet at a corresponding reference frame 315 when accessed.

Referring again to FIG. 3A, processor 220 can instruct MAC 212 to begin a throughput transmission of the data packets referenced by each buffer descriptors 310 (i.e., reference frame 315). Once instructed, MAC 212 begins accessing each buffer descriptor 310 of transmission queue 305. As shown, transmission queue 305 can be divided, via interrupt(s) 320) into at least two sub-queues—namely, sub-queue 325 and sub-queue 330. In some embodiments discussed herein, sub-queue 325 and 330 can be the same size.

MAC 212 typically begins throughput transmission at sub-queue 325 and accesses each buffer descriptor 310 at a respective transmission slot and determines if the accessed transmission slot containing a respective buffer descriptor 310 is "R" (ready) or "NR" (not ready) for transmission. If the buffer descriptor 310 for the particular transmission slot is ready, MAC 212 accesses the buffer descriptor 310, determines a respective reference pointer, accesses the reference frame 315, and transmits the data packet located at the reference frame 315 via, for example, network interfaces 210 (ref. FIG. 2). Subsequently, MAC 212 increments a queue slot counter, marks the transmission slot as not ready (NR), and moves on to the next buffer descriptor in the queue to perform the above described functions (e.g., determines if the packet is ready, etc.).

As discussed above, certain buffer descriptors 310 (ref. FIG. 3B) can include a generate-interrupt-on-completion flag, which once accessed by MAC 212, triggers an interrupt 320. As shown, transmission queue 305 is divided into two sub-queues (i.e., 325 and 330) by one of the interrupts 320. Once MAC 212 transmits all data packets 310 for a particular sub-queue, interrupt 320 triggers. Interrupt(s) 320 do not affect MAC 212, but instead, indicate to processor 220 that MAC 212 has completed transmission of each buffer descriptor for a particular sub-queue. Each of interrupts 320 are typically setup during an initial phase of a transmission process and when triggered, can cause processor 220 to re-mark each buffer descriptor of the recently transmitted sub-queue as ready (R).

For example, MAC 212 accesses each buffer descriptor of sub queue 325 and marks each buffer descriptor 310 is as "NR". Once the last buffer descriptor of sub-queue 325 is accessed, interrupt 320 is triggered. MAC 212 continues to access remaining "R" buffer descriptors 310 of transmission queue 305 and particularly accesses transmission slots of the second sub-queue 330. Once MAC 212 accesses each buffer descriptor of sub-queue 330, another interrupt 320 is triggered and also causes processor 320 to mark each buffer descriptor 310 of the recently transmitted sub-queue as ready (R)—here, processor 220 marks each buffer descriptor 310 of sub-queue 330 as ready (R). This iterative process can continue, with processor 220 marking each transmission slot of a recently accessed sub-queue as R, after MAC 212 moves to a different sub-queue for transmission. This iterative process achieves improved line rate transmission without additional or specialized hardware via double buffering two sub-queues of a single larger transmission queue, which allows MAC 212 to continuously transmit data located at a reference frame at maximum throughput transmission capacity. Additionally, the shared reference frame 315 facilitates improved throughput transmission since only one frame needs to be prepared in memory one time, and its repeated use means its contents will be cached after the first transmission. Further, due to the recent and frequent access, the cached shared reference frame is stored in a fastest section of memory to further improve throughput transmission.

As discussed above, processor 220 and/or MAC 212 functionally organizes the device 200 by, inter alia, invoking operations in support of software processes and/or services executing on the device. With respect to transmit test process/ services, MAC 212 accesses each reference pointer, which are encapsulated by buffered descriptors 310, stored in transmission slots of a first sub-queue 325 of a transmission queue 305. As shown in FIG. 3A (discussed above), each reference pointer 310 is indexed to a shared reference frame 315. MAC 212 can further transmit data from the shared reference frame in response to accessing the reference pointer and can trigger at least one interrupt (i.e., interrupt 320) when each reference pointer of the first sub-queue is accessed at least once. Once each reference pointer of a sub-queue is accessed by MAC 212 and marked as NR, processor 220 can further mark, in response to the at least one interrupt, the NR transmission slots as R (e.g., while MAC 212 continues to access transmission slots of a second sub-queue 330). Additionally, once MAC 212 accesses the transmission slots of the second sub-queue 330, it will loop back to the first transmission queue 325 and begin transmission anew. Once each transmission slot of the second sub-queue 330 is accessed and marked as NR by MAC 212, processor 220 can re-mark the transmission slots as R.

Referring to FIG. 4, there is shown an example simplified test procedure 400 for transmitting data packets at full line rate in accordance with one or more embodiments described herein. Test procedure 400 can include one or more executable steps from transmit test process/services 244, described above.

The procedure 400 starts at step 405, and continues to step 410, where, as described in greater detail above, processor 220 (and/or MAC 212) stores a buffer descriptor (encapsulating a reference pointer) in a transmission slot of a transmission queue. Procedure 400 continues to step 415, where the transmission queue is divided into at least a first sub-queue and a second sub-queue, via at least one interrupt (i.e., interrupt(s) 320). Next, in step 420, MAC 212 accesses each reference pointer stored in the transmission slots of the first sub-queue. Notably, each reference pointer is indexed to a shared memory frame (i.e., reference frame 315 shown in FIG. 3A). In step 425, MAC 212 transmits data from the shared memory frame in response to accessing the reference pointer, and in step 430, MAC 212 triggers at least one interrupt when each reference pointe of the first sub-queue is accessed at least once. As discussed above, such interrupt can cause processor 220, in step 435, to re-mark each buffer descriptor of the recently transmitted queue as "R", while MAC 212 continues to access, in step 440, each reference pointer stored in transmission slots of the second sub-queue. Once complete with accessing each transmission slot of the second sub-queue, MAC 212 can trigger the interrupt again (and/or a new interrupt). Processor 220, in response to the interrupt (in step 450) can mark each transmission slot of the second sub-queue as "R" or ready for transmission. The procedure 400 may subsequently end in step 455, or, may return to step 420 to continue accessing and transmitting data from the first or second sub-queue.

Figure 5:
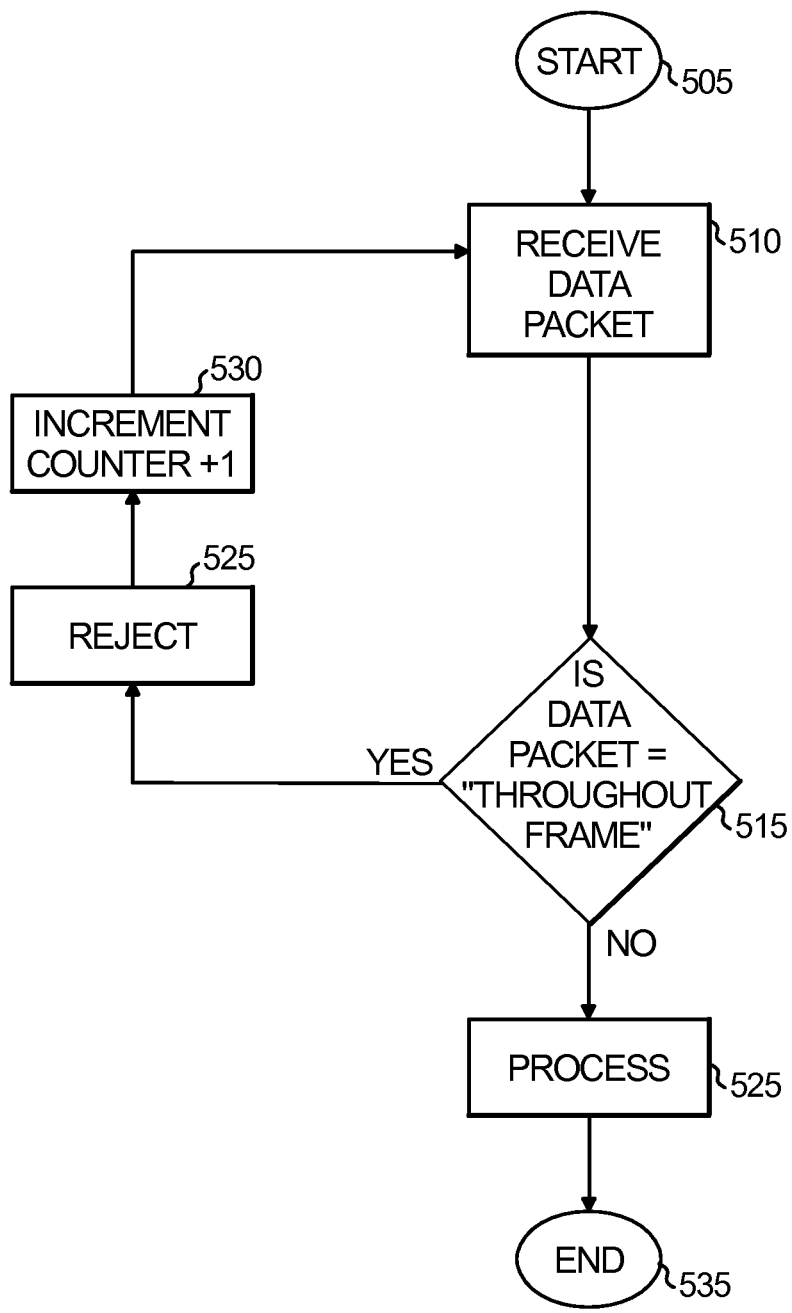
FIG. 5 illustrates an example simplified test procedure for receiving Internet Protocol (IP) data packets or messages in accordance with one or more embodiments.
Figure 6:
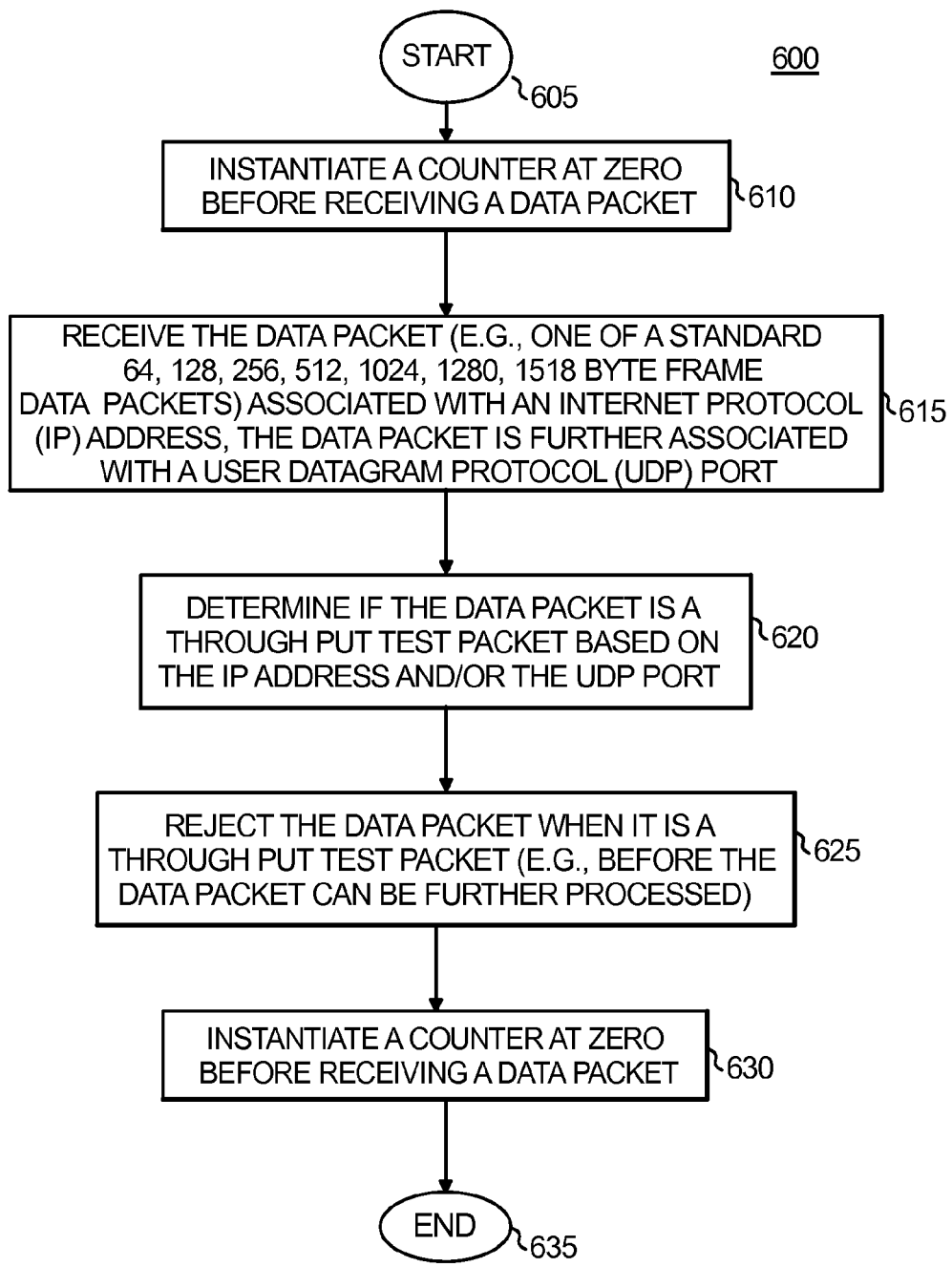
FIG. 6 illustrates another example simplified test procedure for receiving Internet Protocol (IP) data packets or messages in accordance with one or more embodiments, discussed herein.

With reference now to FIGS. 5 and 6, there are shown example simplified test procedures 500 and 600 for receiving Internet Protocol (IP) data packets or messages in accordance with one or more embodiments described herein. Test procedures 500 and 600 can include one or more steps of receive test process 248, discussed above, and provides a steps for receiving, rejecting, and counting data packets (i.e., IP packets) at a full line rate. Such receiving, rejecting and counting allows a device to perform, for example, a receive test of data packets at a full line rate without sacrificing computing power for additional processing of the received packets.

Particularly, procedure 500 begins at start 505 and progresses to step 510 where MAC 212 receives a data packet (e.g., data packet 140 of FIG. 1). Once received MAC 212 compares the data packet to a "throughput frame", in step 515. Throughput frames are a particular type of data packet typically reserved for conducting a communication test. For example, throughput packets can include be User Datagram Protocol (UDP) packets, which can be sent to a particular port and IP address, and/or throughput packets can include a unique pattern in the payload of the frame. If the received data packet is a throughput frame, the packet is rejected, as shown in step 525. Notably, according to some embodiments, only throughput data packets are rejected, while any other data packet is passed on for further processing (i.e., step 520, discussed below). Next, a rejected frame counter (internal to the MAC 212) is incremented, in step 530, and the procedure 500 returns to receive another data packet (in step 510), where as discussed above, MAC can receive a data packet. If the received data packet is not a throughput frame, procedure 500 progresses to step 520, where additional processing occurs. Such processing can include, but is not limited to time measurements, test control frames, or unrelated traffic that is provided to the operating system for further processing. Accordingly, test procedure 500 provides steps to receive IP packets at full line rate such that certain throughput data packets are rejected before any additional components perform any further processing (e.g. storing the received packet in general memory, etc.).

Procedure 600 begins at step 605 and continues to step 610 where, processor 220 and/or MAC 212 instantiate a counter at zero before receiving a data packet. Subsequently, in step 615, MAC 212 receives a data packet (e.g., a standard byte frame data packet). The data packet can be associated with an IP address and/or a user datagram (UDP) protocol port. Once received, MAC 212, in step 620, determines if the data packet is a throughput test packet based on the IP address and/or the UDP port. In some embodiments, MAC 212 can determine if the data packet is a throughput test packet based on a particular field or set of fields in a header or a payload of the data packet, a transmission control protocol (TCP), a UDP port number, an 802.3 EtherType field, a class-of-service or quality of service tag, etc. If the data packet is a throughput test packet, in step 625 the MAC 212 rejects the data packet before further processing. In step 630, MAC 212 increments the counter when the data packet is rejected. Procedure 600 can subsequently end in step 635, or can continue back at step 615, where MAC 212 receives another data packet.

It should be noted that while certain steps within procedures 400-600 may be optional as described above, the steps shown in FIGS. 4-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 400-600 are described separately, certain steps from each procedure may be incorporated into each other procedure, and the procedures are not meant to be mutually exclusive.

The techniques described herein, therefore, provide for improved line rate IP packet communication. In particular, the techniques herein use double buffering techniques on a single transmission queue and shared reference frames to maximize transmission throughput. The techniques further provide maximum reception throughput using specific throughput packet rejection so as to prevent additional processing or tying up device resources.

While there have been shown and described illustrative embodiments that improve line rate IP packet communication, it is to be understood that various other adaptations and modifications may be made within the spirit and scope of the embodiments herein. For example, the embodiments have been shown and described herein with relation to particular components of a device (e.g., MAC 212 and processor 220). However, the embodiments in their broader sense are not as limited, and may, in fact, be used with other types of device components, as is understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   accessing, via a media access controller (MAC), each reference pointer stored in transmission slots of a first sub-queue of a transmission queue, each reference pointer is indexed to a shared memory frame;
   transmitting data from the shared memory frame in response to accessing the reference pointer;
   triggering at least one interrupt when each reference pointer of the first sub-queue is accessed at least once; and
   marking, in response to the at least one interrupt, each transmission slot of the first sub-queue as ready for transmission.

2. The method as in claim 1, further comprising:
   accessing, via the MAC, each reference pointer stored in transmission slots of a second sub-queue of the transmission queue, each reference pointer is indexed to the shared memory frame;
   triggering the at least one interrupt when each reference pointer of the second sub-queue is accessed at least once; and
   marking, in response to the at least one interrupt, each transmission slot of the second sub-queue as ready for transmission.

3. The method as in claim 2, further comprising:
   receiving a data packet associated with an Internet Protocol (IP) address;
   determining whether the data packet is a throughput test packet based on the IP address;
   rejecting the data packet when it is a throughput test packet; and
   incrementing a counter when the data packet is rejected.

4. The method as in claim 3, wherein the data packet is further associated with a User Datagram Protocol (UDP) Port, wherein determining whether the data packet is a throughput test packet further comprises:
   determining whether the data packet is a throughput packet based on the IP address and the UDP port.

5. The method as in claim 3, wherein the data packet has one of a 64 byte frame, a 128 byte frame, a 256 byte frame, a 512 byte frame, and a 1024 byte frame.

6. The method as in claim 3, further comprising:
   instantiating the counter at zero before receiving the data packet.

7. The method as in claim 3, wherein rejecting the data packet further comprises:
   rejecting the data packet before the data packet can be further processed.

8. The method as in claim 1, further comprising:
   storing each reference pointer in the transmission slots of the transmission queue; and
   dividing, via the at least one interrupt, the transmission queue into at least the first sub-queue and the second sub-queue.

9. The method as in claim 8, wherein the first sub-queue and the second sub-queue are substantially the same size.

10. An apparatus, comprising:
    one or more network interfaces to communicate one or more nodes in a communication network;
    a processor coupled to the network interfaces and adapted to execute one or more processes; and
    a memory configured to store a process executable by the processor, the process when executed operable to:
      access each reference pointer stored in transmission slots of a first sub-queue of a transmission queue, each reference pointer is indexed to a shared memory frame;
      transmit data from the shared memory frame in response to accessing the reference pointer;
      trigger at least one interrupt when each reference pointer of the first sub-queue is accessed at least once; and
      mark, in response to the at least one interrupt, each transmission slot of the first sub-queue as ready for transmission.

11. The apparatus as in claim 10, wherein the process, when executed, is further operable to:
    access each reference pointer stored in transmission slots of a second sub-queue of the transmission queue, each reference pointer is indexed to the shared memory frame;

trigger the at least one interrupt when each reference pointer of the second sub-queue is accessed at least once; and mark, in response to the at least one interrupt, each transmission slot of the second sub-queue as ready for transmission.

12. The apparatus as in claim 11, wherein the process, when executed, is further operable to:

receive a data packet associated with an Internet Protocol (IP) address;

determine whether the data packet is a throughput test packet based on the IP address;

reject the data packet when it is a throughput test packet; and increment a counter when the data packet is rejected.

13. The apparatus as in claim 12, wherein the data packet is further associated with a User Datagram Protocol (UDP) Port, wherein the process, when executed to determine if the data packet is a throughput test packet is further operable to:

determine whether the data packet is a throughput packet based on the IP address and the UDP port.

14. The apparatus as in claim 12, wherein the process, when executed, is further operable to:

instantiate the counter at zero before perceiving the data packet.

15. The apparatus as in claim 12, wherein the process to reject the data packet, is further operable to:

reject the data packet before the data packet can be further processed.

16. The apparatus as in claim 10, wherein the process, when executed, is further operable to:

divide, via the at least one interrupt, the transmission queue into at least the first sub-queue and a second sub-queue; and store each reference pointer the transmission slots of the transmission queue.

17. The apparatus as in claim 16, wherein the first sub-queue and the second sub-queue are substantially the same size.

18. A tangible, non-transitory, computer-readable media having software encoded thereon, the software when executed by a processor operable to:

access each reference pointer stored in transmission slots of a first sub-queue and a second sub-queue of a transmission queue, each reference pointer is indexed to a shared memory frame;

transmit data from the shared memory frame in response to accessing the reference pointer;

trigger at least one interrupt when each reference pointer of one of the first sub-queue and the second sub-queue is accessed at least once; and mark, in response to the at least one interrupt, each transmission slot of the corresponding first sub-queue and the second sub-queue as ready for transmission.

19. The computer-readable media as in claim 18, wherein the software when executed is further operable to:

divide, via the at least one interrupt, the transmission queue into at least the first sub-queue and the second sub-queue; and store each reference pointer in the transmission slots of the transmission queue.

20. The computer-readable media as in claim 18, wherein the software when executed is further operable to:

receiving a data packet associated with an Internet Protocol (IP) address;

determining whether the data packet is a throughput test packet based on the IP address;

rejecting the data packet when it is a throughput test packet; and incrementing a counter when the data packet is rejected.

* * * * *